(12) United States Patent
Alberto

(10) Patent No.: US 9,446,718 B2
(45) Date of Patent: Sep. 20, 2016

(54) ROOF STRUCTURE OF A MOTOR VEHICLE

(71) Applicant: RENAULT s.a.s., Boulogne-billancourt (FR)

(72) Inventor: Gilbert Alberto, Flexanville (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/647,659

(22) PCT Filed: Nov. 26, 2013

(86) PCT No.: PCT/EP2013/074761
§ 371 (c)(1),
(2) Date: Jun. 23, 2015

(87) PCT Pub. No.: WO2014/083005
PCT Pub. Date: Jun. 5, 2014

(65) Prior Publication Data
US 2015/0298620 A1    Oct. 22, 2015

(30) Foreign Application Priority Data
Nov. 27, 2012 (FR) ..................... 12 61261

(51) Int. Cl.
*B60R 11/00* (2006.01)

(52) U.S. Cl.
CPC ........ *B60R 11/00* (2013.01); *B60R 2011/0028* (2013.01); *B60R 2011/0047* (2013.01)

(58) Field of Classification Search
CPC ........... B60R 11/00; B60R 2011/0047; B60R 2011/0028
USPC ....................................... 296/37.8
IPC ....................................... B60R 11/00
See application file for complete search history.

(56) References Cited

U.S. PATENT DOCUMENTS 4,783,110 A * 11/1988 Beukema ................ B60R 11/00
                                                        224/311
6,092,916 A *  7/2000 Davis, Jr. ............. B60Q 3/0203
                                                        362/488

(Continued)

FOREIGN PATENT DOCUMENTS

DE    10 2009 041 314 A1    3/2011
GB       2 398 769 A        9/2004
WO       02/097308 A1      12/2002

OTHER PUBLICATIONS

International Search Report Issued Mar. 3, 2014 in PCT/EP13/074761 Filed Nov. 26, 2013.

(Continued)

*Primary Examiner* — Pinel Romain
(74) *Attorney, Agent, or Firm* — Oblon, McClelland, Maier & Neustadt, L.L.P

(57) ABSTRACT

The invention relates to a roof structure of a motor vehicle, comprising a front roof cross member and an intermediate roof cross member located behind the front cross member, said cross members extending in the transverse direction of the vehicle, the structure also comprising an equipment support connecting these cross members to one another approximately in the middle thereof, the support has, at a first end, indexing means that penetrate in the longitudinal direction of the vehicle into corresponding orifices provided in one of the cross members, these indexing means carrying out positioning in the transverse and vertical directions, while the first end cooperates in a bearing manner in the longitudinal direction with a vertical flank of said cross member, and the support has, at a second end, clip-fastening structures that carry out pre-retention in the vertical direction with the other cross member.

8 Claims, 5 Drawing Sheets

(56) References Cited

U.S. PATENT DOCUMENTS

| | | | |
|---|---|---|---|
| 7,029,421 B2 | 4/2006 | Henneken et al. | |
| 7,055,882 B2 * | 6/2006 | Santaolalla Gil | B60R 7/04 224/311 |
| 7,213,874 B2 * | 5/2007 | Osterberg | B62D 25/06 296/203.03 |
| 7,306,276 B2 * | 12/2007 | Berberich | B60R 7/04 296/193.04 |
| 7,407,222 B2 * | 8/2008 | Anderson | B62D 25/06 296/193.05 |
| 7,543,884 B2 * | 6/2009 | Reed | B62D 25/04 296/203.01 |
| 8,662,573 B2 * | 3/2014 | Vantrease | B62D 25/06 296/203.03 |
| 8,752,887 B2 * | 6/2014 | Park | B62D 25/06 296/210 |
| 2001/0026084 A1 * | 10/2001 | Bienert | B60J 7/003 296/214 |
| 2004/0169390 A1 | 9/2004 | Tiesler et al. | |
| 2006/0237984 A1 * | 10/2006 | Stone | B60R 7/04 296/37.7 |
| 2010/0109364 A1 * | 5/2010 | Park | B60R 9/058 296/37.7 |

OTHER PUBLICATIONS

French Search Report Issued Aug. 2, 2013 in French Application 1261261 Filed Nov. 27, 2012.

* cited by examiner

ROOF STRUCTURE OF A MOTOR VEHICLE

FIELD OF THE INVENTION

The present invention relates to a roof structure of a motor vehicle. The invention relates more particularly to a roof structure of a motor vehicle, comprising a front cross member and an intermediate roof cross member located behind the front cross member, said cross members extending in the transverse direction of the vehicle, the structure also comprising an equipment support connecting these cross members to one another substantially in the middle thereof. The intermediate roof cross member is traditionally located in the area of the lateral pillar referred to as the "B-pillar", corresponding to the rear pillar of a front door of the vehicle.

STATE OF THE ART AND PRESENTATION OF THE PROBLEM

Figure 1:
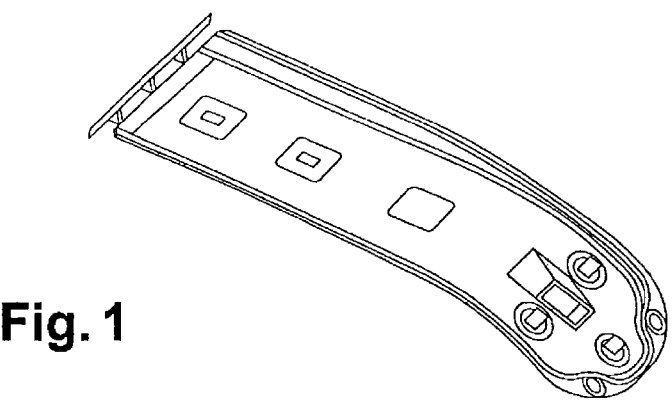

A roof structure of this type is already known, as illustrated in FIG. 1, in which the equipment support is a pressed sheet steel element. Such an element forms a support for cables or other components. It may in addition constitute a means of attachment for a roof handle. However, such a support requires intermediate fasteners, such as clips or other snap connectors for retaining cables or components. These fasteners require specific manufacture and specific pre-assembly on the support. In addition, at the time of its attachment to the roof of the vehicle, such a support must be positioned and held by the operator, both in the area of the front and in the area of the rear, which constitutes a task that is not at all easy or ergonomic in view of the "arms in the air" position of the operator. Furthermore, the weight of such a known support is not insignificant.

The aim of the invention is to overcome all or part of the previous disadvantages.

OBJECT OF THE INVENTION

To this effect, the invention has as its object a roof structure of a motor vehicle, comprising a front cross member and an intermediate roof cross member located behind the front cross member, said cross members extending in the transverse direction of the vehicle, the structure also comprising an equipment support connecting these cross members to one another substantially in the middle thereof, characterized in that the support includes, at its first end, indexing means that penetrate in the longitudinal direction of the vehicle into corresponding orifices provided in one of the cross members, these indexing means ensuring positioning in the transverse and vertical directions, while the first end interacts in a bearing manner in the longitudinal direction with a vertical flank of said cross member, and in that the support includes, at a second end, clip-fastening structures to ensure its pre-retention in the vertical direction with the other cross member, the support also being attached securely to both of the cross members by means of screws that pass through each of the ends of the support.

The support of the invention is constituted by a single component, which itself integrates structures that are adapted to the rapid fastening of various pieces of equipment (cable, electrical connectors, others). It is not necessary, therefore, to manufacture and assemble diverse intermediate fasteners. The support is typically made of a plastic material, furthermore, which imparts considerable lightness to it while remaining sufficiently rigid in view of the ribs provided for this purpose. This support also includes means for indexation (relative positioning) in relation to the front and intermediate cross members, as well as pre-retention means which, in particular, facilitate the operations of assembly with the structure of the vehicle and, in so doing, improve the ergonomics. The support is also openable and accessible, for example by removing a roof console, which makes it possible to intervene without difficulty during repair operations or when upgrading specific pieces of equipment. Cables may, in fact, be provided as a matter of course, whereas certain items of multimedia equipment or other equipment may or may not be installed as original equipment, or may be installed subsequently as retro-fitted items at the request of the client, at which time they are connected to the corresponding cables.

According to other advantageous characterizing features of the invention:
- the first and the second ends of the support are respectively its front and rear ends, which ends are secured on front and rear cross members,
- the support is a component made of injection molded plastic, including clip-fastening structures for cables and/or for electrical connectors and/or for wireless signal transceiver(s),
- the support includes clip-fastening structures for a roof center console incorporating operating controls and/or visual displays,
- the support includes, from its front end as far as its rear end:
  - a plate forming an enlarged zone, located on which are a plurality of clip-fastening structures,
  - a structural beam connecting the plate to the intermediate cross member, said beam being provided in particular with one or more clips and/or with clip-fastening structures for cables distributed along the beam,
  - an attachment foot on the intermediate cross member,
- the intermediate cross member includes a lower face provided with a recess at its center, said recess receiving the end foot of the support forming a deflection facing downwards relative to the beam,
- the clip-fastening structures ensuring the pre-retention of the rear end of the support with the intermediate cross member are adapted to absorb the geometric variations in production and assembly between the front cross member and the intermediate cross member,
- the support comprises stiffening ribs located on the beam, the plate and the attachment foot opposite the plate.

DETAILED DESCRIPTION OF THE INVENTION

Figure 2:
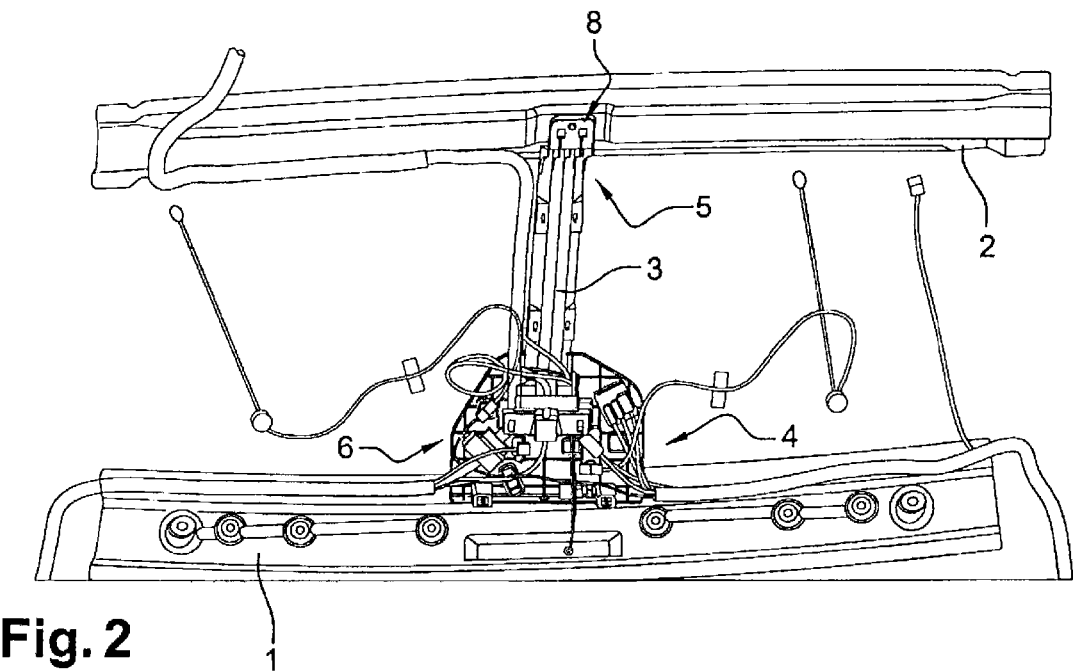
Figure 3:
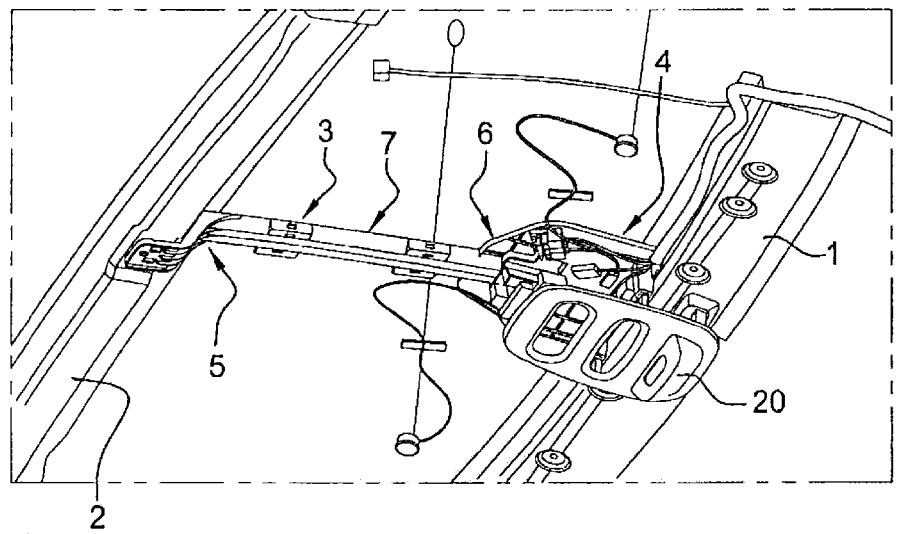
Figures 4, 5:
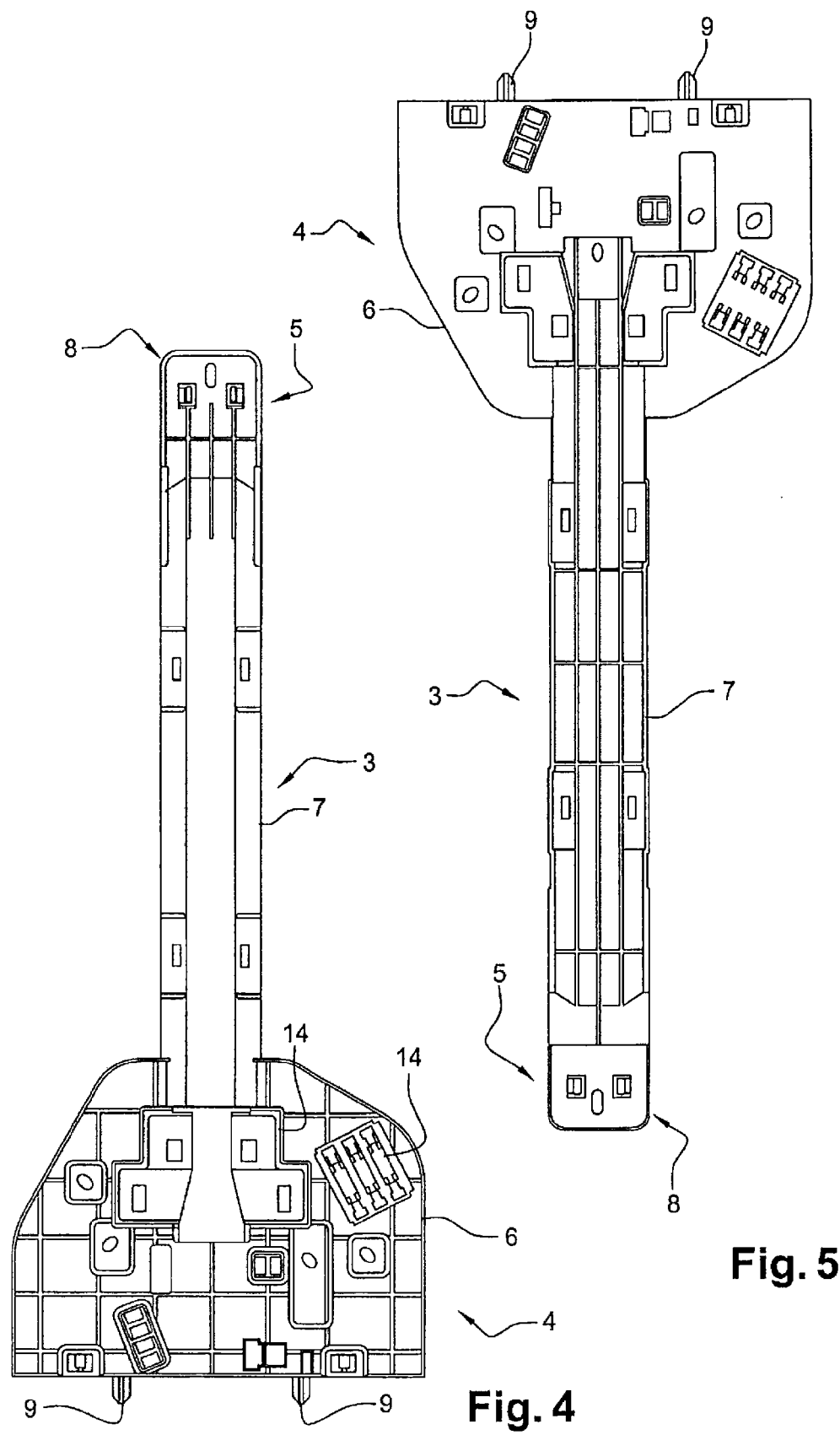
Figure 6:
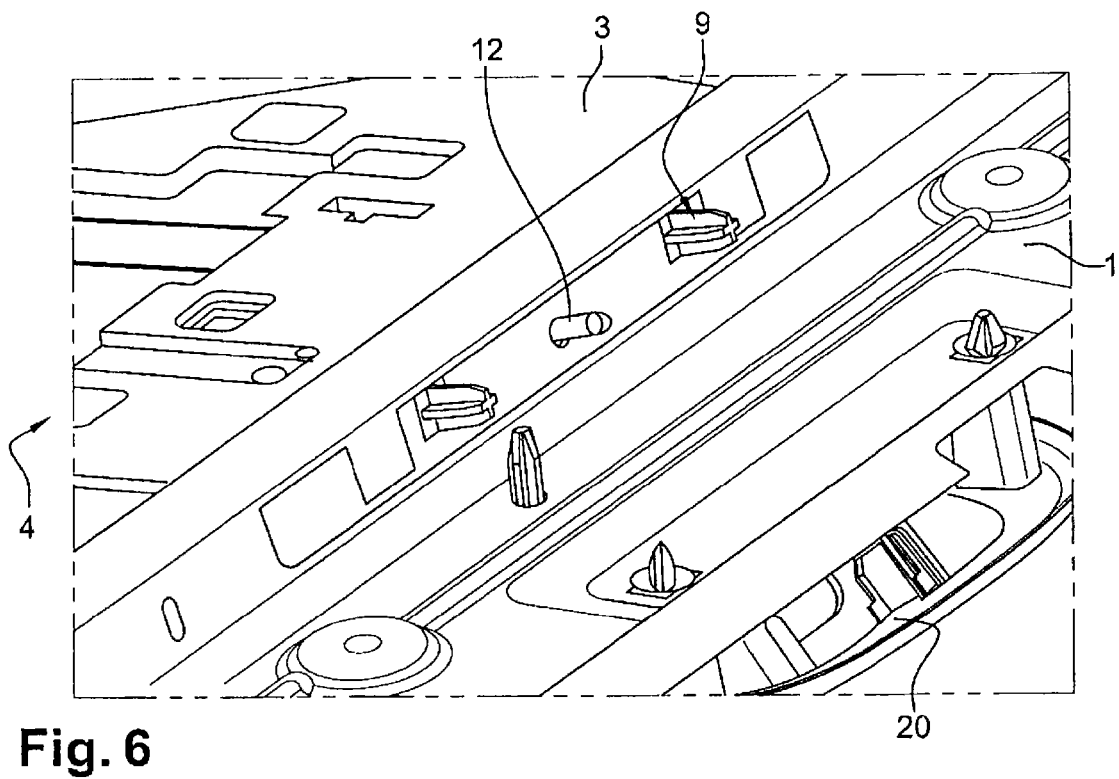
Figure 7:
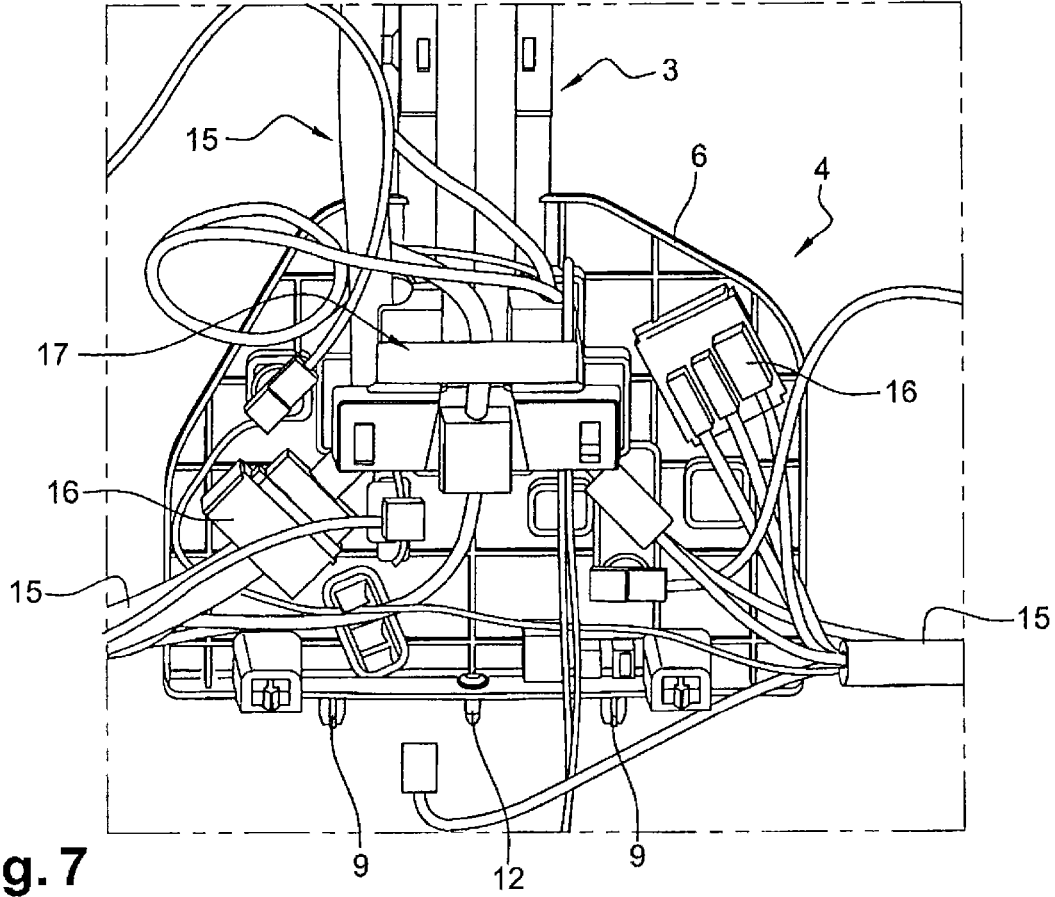
Figure 8:
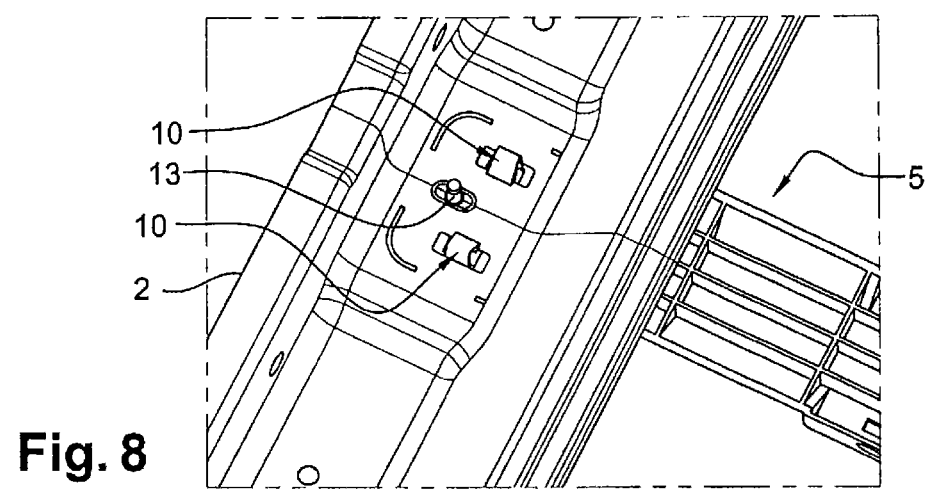
Figure 9:
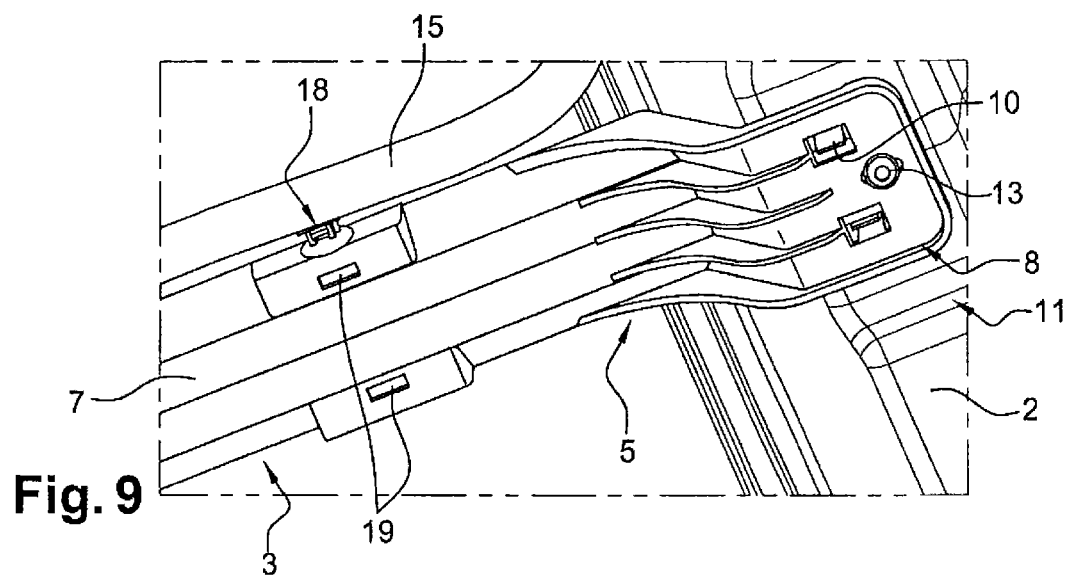
Figure 10:
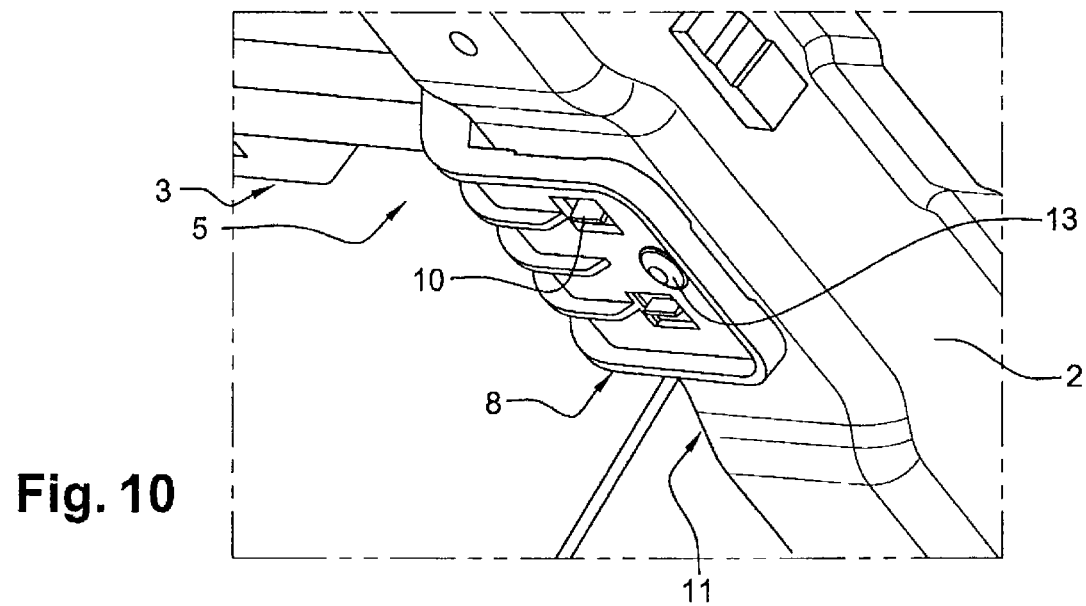
Figure 11:
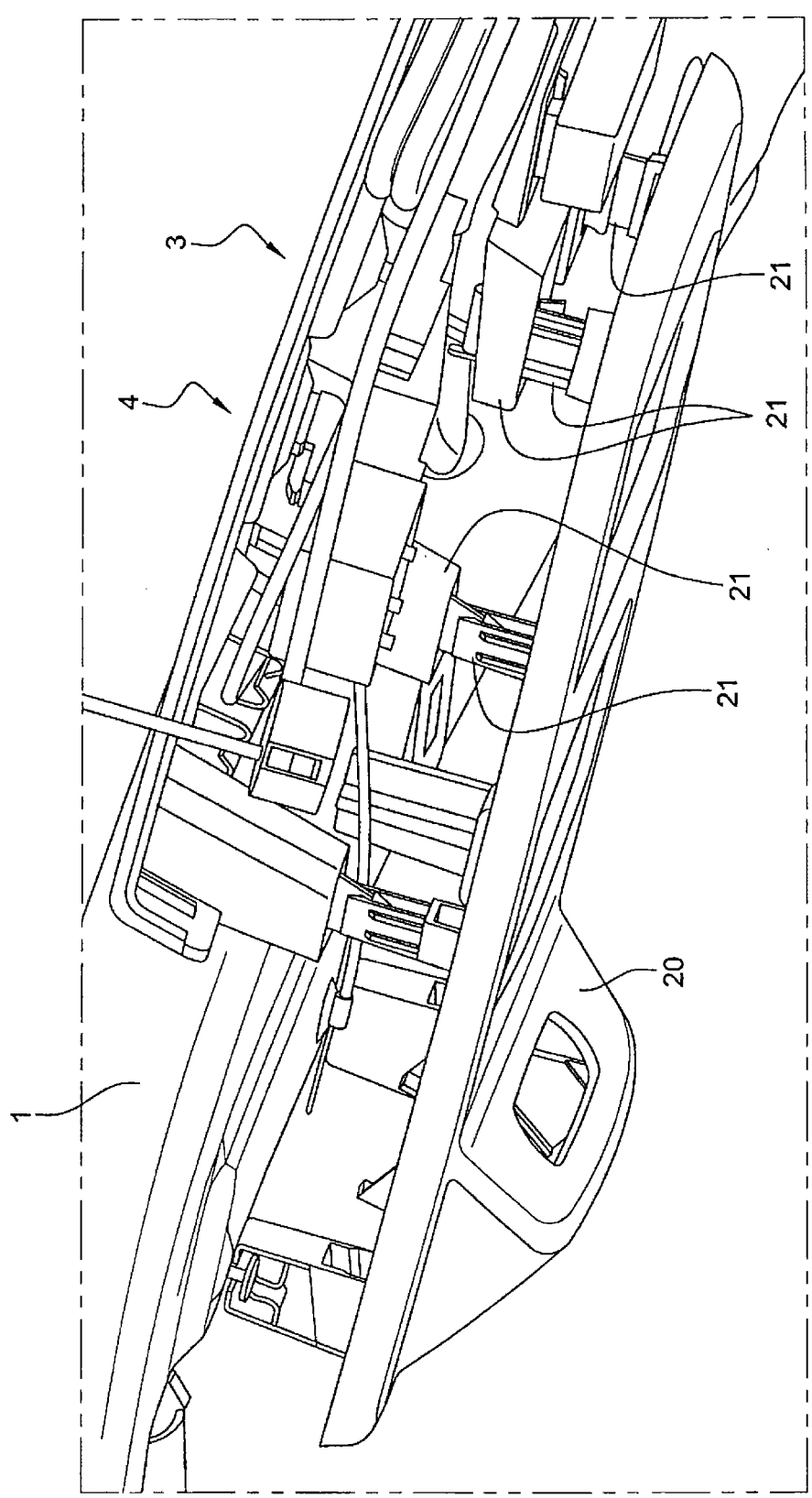

The invention will be better understood from a perusal of the following description of a non-exhaustive example of the invention and in the light of the accompanying drawings, in which:

FIG. 1 depicts a view of an equipment support according to the prior art,

FIGS. 2 and 3 are general views of the front and intermediate cross members, mounted between which is an equipment support according to the invention, FIGS. 4 and 5 are flat views, respectively from below and from above, of the equipment support according to the invention, FIG. 6 is a partial view of the front end of the support according to the invention, indexed and attached to the front cross member of the roof structure, FIG. 7 is a view from below of the front end of the support according to the invention, illustrating the region of the plate, FIG. 8 is a partial view of the rear end of the support of the invention, illustrating the means for the pre-retention and the attachment of the support to the intermediate cross member, FIGS. 9 and 10 are views of the foot of the rear end of the support applied and attached to the intermediate cross member in the area of the central recess, FIG. 11 is a partial view in perspective of the front end of the support of the invention, to which the roof console is attached in part.

In the following description, the directions are indicated with reference to the conventional XYZ benchmark for the vehicle, in which X designates the longitudinal direction of the vehicle, facing towards the rear, Y designates the transverse direction of the vehicle, facing towards the right, and Z designates the vertical direction.

Front 1 and intermediate 2 cross members of a motor vehicle according to the invention are depicted in FIGS. 2 and 3 (the sheet metal part of the roof is not depicted). These cross members 1, 2 are substantially parallel to each other and extend transversely to the longitudinal direction X of the motor vehicle for the entire width of the vehicle. The intermediate cross member 2 is located at right angles to the "B-pillar" of the vehicle, conventionally corresponding to the rear pillar of the front door frame. The cross members are structural elements made of pressed steel having a substantially trough-shaped or U-shaped cross section, of which the concave part is oriented towards the top and of which the edges are welded to the sheet metal roof panel of the vehicle.

A support 3 for multifunctional pieces of equipment is mounted between the front 1 and rear 3 cross members. This support 3 connects these cross members 1, 2 together substantially in the middle thereof. The support 3 is typically made of an injection molded plastic material.

As illustrated in FIGS. 4 and 5, the support 3 has a generally elongated form extending in the longitudinal direction X. It includes, from its front end 4 as far as its rear end 5:
- a plate 6 forming an enlarged zone, located on which are a plurality of clip-fastening structures,
- a central structural beam 7 connecting the plate 6 to the intermediate cross member 2, said beam being provided in particular with one or more clips and/or with clip-fastening structures for cables distributed along the beam 7,
- a foot 8 for attaching the beam 7 to the intermediate cross member 2.

With reference to FIGS. 4 to 7, the support 3 includes, at its front end 4, indexing means 9, typically constituted by two pins extending in the longitudinal direction X, each having a pointed end and a ribbed body, of which the transverse section exhibits the general form of a cross. These indexing means 9 are configured to be introduced snugly into corresponding orifices provided in the front cross member 1. These orifices are provided in a substantially vertical rear face of the front cross member 1. These indexing means 9 are adapted to the edges of the orifices in order to ensure positioning in the transverse Y and vertical Z directions. In addition, the first end 4 of the support, and more specifically a substantially rectilinear front edge of the plate 6, interacts in a bearing manner in the direction X with the same face of the front cross member 1, in such a way as to achieve adequate positioning of the support 3 in the direction X in relation to the front cross member 1.

As depicted in FIGS. 8 and 9, the support 3 includes, at a rear end 5, clip-fastening structures 10 located on the attachment foot 8. The latter are constituted by elastically deformable feet penetrating vertically into corresponding orifices provided in the horizontal lower face of the intermediate cross member 2. These orifices have a dimension in the longitudinal direction X which is greater than the dimension of the feet, such as to absorb any variations in production or in positioning between the front 1 cross member and the intermediate 2 cross member. Typically in this case, the orifices receiving the clip-fastening structures 10 exhibit a generally elongated form in the longitudinal direction X.

The intermediate cross member 2 includes a lower face provided with recess 11 at its center (FIGS. 9-10), said recess 11 receiving the end foot 8 of the support 3 forming a deflection facing downwards relative to the beam (7). The recess 11 allows the thickness of the foot 8 to be integrated into the overall thickness of the intermediate cross member 2, such that the headlining (not depicted here) may be applied and attached to the cross member without forming an excess thickness at the location of the foot 8.

The support 3 is in addition attached securely to both of the cross members ( ) by means of screws at the front 12 (FIGS. 6-7) and at the rear 13 (FIGS. 8-10) passing through each of the ends of the support 3. At the front, a screw 12 is located between the indexing means 9, for example, and is oriented parallel to the latter, said screw being screwed into the face against which the support 3 is in bearing contact. At the rear, a screw 13 is screwed vertically into the horizontal lower face against which the foot is in bearing contact and is pre-retained by the clip-fastening structures 10.

The support 3 includes clip-fastening structures 14 (FIG. 4) for cables 15 (FIG. 7) and/or for electrical connectors 16 and/or for wireless signal transceiver(s) 17. These cables 15 are typically power supply cables for the rear lights, power supply cables for the air conditioning system and/or multimedia cables (navigation, radio). The wireless signal transceiver(s) 17 are connected, for example, to the navigation system. They may include a receiving antenna for a hands-free access system (for example with a card or a badge) or some other antenna or transceiver. These examples are provided purely for illustrative purposes and are in no way exhaustive. The support 3 thus comprises a set of forms or housings that are complementary to the aforementioned cables and pieces of equipment and enable the latter to be retained by clipping. It should be noted that the support may also receive clips by clipping, said clips themselves being provided with complementary clamps or clipping means for the purpose of retaining the cables in particular zones. For example, two clips 18 are positioned along the beam 7 of the support 3 enabling a cable 15 to be held running along this beam 7 between the front cross member 1 and the rear cross member 2. The beam advantageously includes orifices 19 (FIG. 9) providing access to a concealed part of these clips 18, with the help of an appropriate tool such as a screwdriver, enabling these clips to be removed without being obliged to remove the support 3 in its entirety or running the risk of breaking an element.

Numerous clip-fastening structures 14 are located and concentrated on the plate 6 in front of the support 3, thereby constituting a technical zone having an abundance of various pieces of equipment, permitting easy repairs or desired upgrades.

The support 3 further includes clip-fastening structures 21 for a central roof console 20 (FIGS. 3, 6, 11) incorporating operating controls and/or visual displays. These clip-fastening structures 21 are downwardly projecting, for example, or receive corresponding clipping feet formed on the roof console 20. In the illustrated case, the roof console 20 is attached in part to the plate 6 of the support 3 via appropriate clip-fastening structures, and in part to the front cross member 1 (FIG. 11).

The support 3 according to the invention made of a plastic material advantageously comprises stiffening ribs distributed over its entire surface and in particular in the zone of the beam 7, thereby making it possible to guarantee adequate mechanical strength.

Such a roof structure comprising such a support 3 allows a large number of cables to be passed into the central zone of the roof, which does not overfill the lateral zones of the roof where other pieces of equipment are present, in particular inflatable bags or Airbags®.

The support 3 of the invention is light, robust, multifunctional (support for various pieces of equipment), non-aggressive and easy to install at the time of its assembly on the vehicle. The assembly ergonomics is improved in particular with respect to the indexation and the pre-retention on the cross members. The invention is not, of course, restricted to the embodiments or variant embodiments described above and includes all the technical equivalents of these means.

The invention claimed is:

1. A roof structure of a motor vehicle, comprising:
   a front cross member extending in the transverse direction of the vehicle;
   an intermediate cross member located behind the front cross member extending in the transverse direction of the vehicle; and
   an equipment support connecting the front and intermediate cross members to one another substantially in the middle thereof, the equipment support comprising:
      a first end having an indexing structure that penetrates in the longitudinal direction of the vehicle into corresponding orifices provided in one of the the front and intermediate cross members, this indexing structure ensuring positioning in the transverse and vertical directions, while the first end interacts in a bearing manner in the longitudinal direction with a vertical flank of said one of the front and intermediate cross members, and
      a second end having clip-fastening structures to ensure pre-retention of the second end in the vertical direction with the other one of the front and intermediate cross members, the equipment support also being attached securely to both of the front and intermediate cross members by screws that pass through each of the first and second ends of the equipment support.

2. The roof structure as claimed in claim 1, wherein the first and the second ends of the support are respectively front and rear ends of the support, which ends are secured on said front and intermediate cross members.

3. The roof structure as claimed in claim 1, wherein the support is a component made of injection molded plastic, including clip-fastening structures for cables and/or for electrical connectors, and/or for wireless signal transceiver(s).

4. The roof structure as claimed in claim 3, wherein the support includes clip-fastening structures for a roof center console incorporating operating controls and/or visual displays.

5. The roof structure as claimed in claim 3, wherein the support includes, from its front end as far as its rear end:
   a plate forming an enlarged zone, located on which are a plurality of clip-fastening structures,
   a structural beam connecting the plate to the intermediate cross member, said beam being provided in particular with one or more clips and/or with clip-fastening structures for cables distributed along the beam, and
   an attachment foot on the intermediate cross member.

6. The roof structure as claimed in claim 5, wherein the intermediate cross member includes a lower face provided with a recess at its center, said recess receiving an end foot of the support forming a deflection facing downwards relative to the beam.

7. The roof structure as claimed in claim 2, wherein the clip-fastening structures ensuring the pre-retention of the rear end of the support with the intermediate cross member are adapted to absorb the geometric variations in production and assembly between the front cross member and the intermediate cross member.

8. The roof structure as claimed in claim 5, wherein the support comprises stiffening ribs located on the beam, the plate and the attachment foot opposite the plate.

* * * * *